(12) United States Patent
Hutmacher et al.

(10) Patent No.: US 7,013,861 B1
(45) Date of Patent: Mar. 21, 2006

(54) SELF-IGNITING INTERNAL COMBUSTION ENGINE

(75) Inventors: Rolf Hutmacher, Remshalden (DE);
Gerhard Koenig, Lauterstein (DE);
Karl Maderthaner, Stuttgart (DE);
Alois Raab, Boebingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/508,570

(22) PCT Filed: Mar. 8, 2003

(86) PCT No.: PCT/EP03/02393

§ 371 (c)(1),
(2), (4) Date: Aug. 25, 2005

(87) PCT Pub. No.: WO03/081010

PCT Pub. Date: Oct. 2, 2003

(30) Foreign Application Priority Data

Mar. 22, 2002 (DE) ................................ 102 13 011

(51) Int. Cl.
*F02F 3/26* (2006.01)
*F02B 3/08* (2006.01)

(52) U.S. Cl. ...................................... 123/276; 123/299

(58) Field of Classification Search ................ 123/276, 123/294, 298, 299, 300, 305; 239/88, 533.9, 239/533.12
See application file for complete search history.

(56) References Cited

U.S. PATENT DOCUMENTS

| | | | |
|---|---|---|---|
| 4,903,896 A * | 2/1990 | Letsche et al. | .......... 239/533.9 |
| 5,103,789 A | 4/1992 | Hartman et al. | |
| 6,302,080 B1 | 10/2001 | Kato et al. | |
| 6,505,601 B1 | 1/2003 | Jorach et al. | |
| 6,644,268 B1 * | 11/2003 | Konig et al. | ................. 123/299 |
| 6,840,209 B1 * | 1/2005 | Shimazaki | ................... 123/276 |

FOREIGN PATENT DOCUMENTS

| | | |
|---|---|---|
| DE | 199 53 932 | 5/2001 |
| EP | 0 786 592 | 7/1997 |
| EP | 0 853 188 | 7/1998 |
| JP | 09042104 A * | 2/1997 |

OTHER PUBLICATIONS

Ron Zevenhoven, "Non-Ideal Gases In Diesel Engine Processes", First Biennal Meeting and General Section Meeting of the Scandinavian-Nordic Section of the Combustion Institute, Chalmers Unviversity of Technology, Gothenburg (Sweden), Online! 18.-20, Apr. 2001, Section 1-6, XP-002240088.

(Continued)

*Primary Examiner*—Willis R. Wolfe, Jr.
(74) *Attorney, Agent, or Firm*—Crowell & Moring LLP

(57) ABSTRACT

An internal combustion engine has compression ignition, in which fuel is injected as a pre-injection and main injection directly into a working space by means of an injection nozzle having a plurality of injection holes, with the prejection taking place in a clocked manner. In order to minimize the moistening of the walls of the combustion chamber, a combustion chamber is provided, in which are arranged an injection nozzle in the region of a cylinder center axis in the cylinder head and a piston recess arranged in the piston head, with an approximately centrally situated piston recess projection being arranged in the piston recess. The stroke of a nozzle needle of the injection nozzle is set in such a manner that a restricting of the range of the injected fuel jets is obtained.

34 Claims, 4 Drawing Sheets

OTHER PUBLICATIONS

Goroncy J: "Direkteinspritzender Dieselmotor mit 1, 9L Hubraum, Direct Injected-Diesel Engine For Golf and Vento", MTZ Motortechnische Zeitschrift, Stuttgart, Germany, Bd. 54, No. 10, Oct. 1993, XP 000397806.

* cited by examiner

SELF-IGNITING INTERNAL COMBUSTION ENGINE

BACKGROUND AND SUMMARY OF THE INVENTION

The invention relates to a method for operating an internal combustion piston engine, in particular a diesel internal combustion engine in which fuel is injected directly into a combustion chamber in a plurality of fuel jets of a certain range by means of an injection nozzle comprising a nozzle needle and injection holes, some of the fuel from an injection cycle being injected in partial quantities during a compression cycle as a clocked pre-injection, and a remaining fuel being injected at a later time as a main injection into the combustion chamber at a higher injection pressure than during the pre-injection. The invention also relates to a combustion chamber design for carrying out this method.

This application is related to application Ser. No. 10/508,558, filed on even date herewith and based on PCT/EP/03/02392.

In the modern internal combustion engines having self-ignition, the fuel is injected directly into a combustion chamber. In the case of a combustion of this type, there inevitably arise due to the heterogeneous manner in which the combustion is conducted local zones in which there is a virtually stoichiometric fuel/air mixture. High combustion temperatures are produced in these zones, resulting in a high thermal NO formation. On the other hand, further zones which are rich in fuel and in which soot is formed arise. Given good turbulent mixing and an excess of air, some of the soot which is formed is re-oxidized, with complete burning off of the soot not being achieved.

German Patent Document DE 19953932 A1 (corresponding U.S. Pat. No. 6,505,601) discloses a method in which a combined homogeneous/heterogeneous method of operation for obtaining average and relatively high loads is proposed. In this method, the intention is for one injection strategy to be used both to permit an early homogeneous mixture formation in the compression stroke and also a subsequent heterogeneous mixture formation around the upper dead-center position, with the fuel injection in the case of the homogeneous mixture formation taking place at a lower injection pressure than in the case of the heterogeneous mixture formation in order to avoid fuel from being deposited onto the cold walls of the combustion chamber.

It has nevertheless been shown that, despite the above-proposed measure, portions of the fuel pass onto the walls of the combustion chamber and, for the most part, do not participate in the homogeneous combustion, and lead to increased HC and CO emissions. Therefore, further measures have to be taken to prevent any further moistening of the wall of the combustion chamber with fuel.

The invention is based on the object of providing a method for an internal combustion engine having self-ignition, with which a depositing of fuel on the walls of the combustion chamber is avoided. This is achieved according to the invention by providing a method of the above-mentioned type, wherein the pre-injection is clocked in such a manner that, for each partial quantity, a range of the fuel jet in the combustion chamber is restricted to be somewhat smaller than a distance to a boundary of the combustion chamber, whereby a disintegration of the injected fuel jets is reinforced at the same time, and wherein the combustion chamber is bounded by a cylinder and a piston, said injection nozzle being disposed in a region of a cylinder central axis and said piston including a piston head which in use faces the injection nozzle and includes a piston recess with an approximately centrally disposed recess projection. Furthermore, it is the aim of the invention to provide a combustion chamber design with which a self-igniting internal combustion engine is improved in respect of the exhaust behavior and the consumption. This is achieved according to the invention by providing a combustion chamber design which has an inwardly opening nozzle needle and a plurality of injection holes, wherein the combustion chamber includes at least one outlet valve, and at least one inlet valve, wherein the stroke of the nozzle needle of the injection nozzle is set in such a manner that, within the injection nozzle, an effective flow cross section between the nozzle needle and the needle seat is approximately 0.4 to 1.5 times an effective flow cross section of the sum of all of the injection holes.

Further refinements emerge from the subclaims.

According to the method according to the invention, the fuel is injected directly into a combustion chamber by means of an injection device which comprises an injection nozzle having a plurality of injection holes and a nozzle needle. Some of the fuel of the particular cycle is present in a compression stroke of the internal combustion engine as a clocked pre-injection in a plurality of partial quantities in the form of fuel jets having a certain range, the remaining fuel being injected as a main injection at a later time. The fuel is optionally injected during the main injection into the combustion chamber at a higher pressure than during the pre-injection.

According to the invention, the pre-injection is clocked in such a manner that, for each injected partial quantity, the range of the fuel jet in the combustion chamber is restricted. The range is somewhat smaller than the distance to a boundary of the combustion chamber, with a disintegration of the injected fuel jets in the combustion chamber being reinforced. The individual injection cycles are configured during the pre-injection in such a manner that the jet pulses are matched in each case to the individual injections, and, given the density of the gas in the combustion chamber at a particular instant, the range of the fuel jets is approximately the distance as far as the cylinder wall on the combustion-chamber side, or the piston head. A depositing of fuel on the wall is therefore avoided. The injection jet pulse and the partial injection quantity are controlled by the duration of the pulse in combination with specific use of the throttling of the inflowing fuel in the seat of the nozzle needle, with the result that the injected fuel jets disintegrate because of reinforced atomization. As a result, the best possible mixture homogenization of the injected partial quantities takes place, with a significant depositing of fuel onto the cylinder wall being avoided at the same time.

The higher pressure means that, for the heterogeneous portion of combustion, the criteria for an effective, conventional injection are fulfilled, since what is important here is a high jet pulse, intensive jet/wall interaction, and as good as possible utilization of air and turbulent mixing.

According to one embodiment of the invention, a stroke of the nozzle needle of the injection nozzle varies during the clocked pre-injection. This permits a specific injection of fuel during the clocked pre-injection, as a result of which the operating range with purely homogeneous combustion can be further expanded. Furthermore, the variation of the needle stroke permits a high degree of homogenization, since the accumulation of fuel particles on the walls of the combustion chamber is minimized. As a result, the knocking tendency can be reduced to a certain degree.

According to the invention, the pressure of the injected fuel can be varied during the clocked pre-injection. In this case, the injection pressure is preferably raised in order to counteract the rising pressure in the combustion chamber during the compression. This enables, for example, the depth of penetration of the injection jets in the combustion chamber to be kept constant during the clocked pre-injection.

According to a further variant of the invention, a cycle duration during the pre-injection is varied in such a manner that the partial quantities of fuel of the pre-injection differ. In this case, the variation can be designed in such a manner that the partial quantity of fuel injected later is larger than the previous partial quantity of fuel. Furthermore, according to the invention the last partial quantity of fuel of the pre-injection can be reduced in relation to the largest partial quantity of fuel that has previously occurred in the pre-injection in order to oppose a severe enrichment of the mixture cloud which has already been homogenized in advance.

For greater atomization of the fuel, according to the invention the stroke of the nozzle needle of the injection nozzle is varied, so that an unstable, cavitating flow is produced in the injection holes of the injection nozzle. As a result, an expansion of the injection jets and therefore a better distribution of the fuel can be achieved.

For the specific setting of a desired throttling action in the seat of the nozzle needle and an unstable, cavitating flow, a suitable structural measure, for example a double spring holder on the injection valve or a piezostrictive or magnetostrictive activation, can be used to assist in keeping the nozzle needle in a stroke position lying between the completely closed and completely open position. In this case, the effective flow cross section in the needle seat, i.e. between the nozzle needle and the needle seat, should be approximately 0.4 to 1.5 times the effective flow cross section of the sum of the injection holes.

By means of the mixture formation, obtained during the compression stroke, of the pre-injected quantity of fuel, with a high excess of air during the combustion, a significant thermal NO formation, and also formation of soot, are avoided, since the fuel is distributed finely and over a large area over the entire combustion chamber. For the main injection, which is matched thereto and takes place at a later time, the thermal NO formation for the heterogeneous phase of combustion is significantly reduced, because the concentration of oxygen is already significantly reduced by the preceding, homogeneous portion of combustion. An intensive, turbulent charging movement is preferably induced by the injection, this movement being assisted by the high injection pressure.

An optimum homogenization of the pre-injected portions of fuel in the compression stroke is achieved by the clocked pre-injection, with the result that the fuel jets first of all injected in the combustion chamber evaporate, and then mix with air before the next jets follow. Since, with the increase in compression, the pressure in the combustion chamber likewise increases, more fuel is added during the following clocking action.

In this case, the partial quantities occurring later in the form of fuel jets are impeded by the increased pressure in the combustion chamber from passing onto the wall of the combustion chamber or boundary of the combustion chamber. An increase in the injected quantity of fuel in the following partial quantity is therefore made possible during the clocking action, which is brought about by means of an increase in pressure in the fuel injection pressure or by an extension of the needle stroke.

An expanded cycle duration also gives rise to an increase in the quantity of fuel inserted. The simultaneous combination of two or even three of the abovementioned measures would also be conceivable.

A decrease in the partial injection quantity during the last clocking action may be advantageous in order to prevent a premature ignition of the homogenized mixture before the main injection occurs. Furthermore, the reduction of the last partial quantity during the clocked pre-injection can avoid over-enriching the mixture cloud which has been homogenized in advance.

In order to increase the rate of homogenization during the pre-injection, a swirling movement is produced in the combustion chamber, for example by means of a swirl inlet duct. It is the aim here to offset or laterally displace or move a fuel cloud of an injected fuel jet, which cloud is produced during an injection cycle, in such a manner that, during a following injection cycle, the newly injected fuel jet does not penetrate the fuel cloud of the preceding fuel jet.

According to one particularly advantageous embodiment, the pre-injection for the homogeneous portion of combustion takes place with clocking occurring two to seven times in a combustion stroke range of approx. 150° CA to 30° CA before the upper dead-center position. The number of clocking actions and also the injection time of the first partial quantity can be varied as a function of the load.

By contrast, the main injection is carried out, for the heterogeneous portion of combustion, in a range around the upper dead-center position either as a block injection or with a different injection profile, with the result that the flow of injected quantity of fuel is varied within the length of duration of the main injection in order to obtain a high pulse for the injection jets. A main injection with differing flow can be obtained by means of pressure modulation and/or by varying the stroke of the nozzle needle. In order to satisfy the requirements for an effective and heterogeneous combustion, the injection pressure is preferably raised to a maximum level, for example between 1800 and 2400 bar, for example by an injection device capable of pressure modulation. As appropriate, a short after-injection can follow directly after the closing of the nozzle needle during the block injection in order to obtain a further reduction in soot. It is conceivable for both the pre-injection and also the main injection to take place with the same fuel pressure. For example, in a common rail system, a pressure level of between 1000 and 1400 bar can prevail.

The after-injection is alternatively part of the main injection. In order- to obtain optimum combustion, the main injection and, if appropriate, the after-injection take place successively as a function of the load around the upper dead-center position in a range of 10° CA before the upper dead-center position to 40° CA after the upper dead-center position, with an opening duration of the nozzle needle during the after-injection being set to be smaller than the opening duration of the needle of the main injection. It is also possible optionally for a late after-injection to take place which again does not participate in the combustion, and can serve only to regenerate an exhaust aftertreatment system connected downstream.

An injection strategy is proposed in the method according to the invention making it possible to use an advantageous propagation of the fuel jet and mixture formation in a specific manner. Both homogeneous and heterogeneous combined combustion are obtained. In this case, a multi-hole-type nozzle is used. The injection pressure is preferably adapted by means of a suitable injection system capable of pressure modulation. In this case, a needle-stroke-controlled injection system with pressure modulation can be used.

Further criteria for designing an additional after-injection may arise from the requirements of a possible exhaust aftertreatment measure.

In order to carry out the method according to the invention, a combustion chamber is proposed which has, in the cylinder head, an injection nozzle, which is arranged in the region of a cylinder center axis and has an inwardly opening nozzle needle, and a piston, with a piston recess having a centrally arranged compression projection being situated in the piston head.

According to the invention, a stroke of the nozzle needle of the injection nozzle is set in such a manner that, within the injection nozzle, an effective flow cross section between the nozzle needle and the needle seat is approximately 0.4 to 1.5 times an effective flow cross section of the sum of all of the injection holes.

According to a preferred embodiment of the invention, the piston recess has, from the piston head, first of all a flat inlet having a small curvature and, from the region of the maximum recess depth, a greater curvature reaching into the piston recess projection. A transition between the piston head and the piston recess is of rounded design. The piston recess projection has a conical shape with a rounded, blunted point.

According to the invention, the moistening of the walls of the combustion chamber during the clocked pre-injection is prevented in such a manner that the injection nozzle arranged in the region of the cylinder center axis injects the fuel in the form of fuel jets with a limited range, and that the injected fuel does not moisten the piston recess arranged in the piston head to a significant extent.

The piston recess is of approximately plate-like design in its basic shape, with a projection extending from the center of the piston recess in the direction of the injection nozzle. The plate-like basic shape means that, in the piston recess, there are no narrow radii on the surface or cross-sectional jumps in the piston material, with the result that, during operation of the internal combustion engine, if droplets of fuel strike against the recess, they rapidly evaporate.

Since the recess depth comes less toward the outside diameter of the piston and, at the transition to the piston head, a flat inlet with no sharp transistions of any type is provided, the accumulation of fuel is prevented.

The invention envisages that the shape of the combustion chamber and the configuration of the injection nozzles, in which a spray cone angle of 90° to 160° can be set, make it possible, during the pre-injection which takes place at an early point, for an increased homogenization to take place and for a depositing of fuel on the cylinder wall to be greatly reduced. At the same time, the geometrical shape of the combustion chamber has a very advantageous effect on the heterogeneous mixture formation during the main injection, with the result that a combined homogeneous/heterogeneous operation can easily be brought about within a working cycle using a conventional multi-hole-type nozzle.

According to the invention, the stroke of the nozzle needle can be adjusted in an opening direction, with the result that the stroke of the nozzle needle can be set in a variable manner during the clocked pre-injection. The stroke can alternatively be set as a function of the load. As a result, the injection quantity used during the clocked pre-injection is varied. Furthermore, the adjustment of the stroke causes an unstable, cavitating flow to be produced in the injection holes of the injection nozzle.

At least one injection nozzle which is arranged approximately centrally in the cylinder head of the internal combustion engine is proposed for the injection of the fuel. This may in principle be a conventional and therefore financially favorable hole-type nozzle of the seat-hole type, mini blind-hole type or blind-hole type.

According to one preferred embodiment of the invention, the injection nozzle has six to fourteen injection holes which are distributed over the circumference in one or two rows of holes. The distribution can take place uniformly. The injection holes are inclined in each case by an angle of 45° to 80° with respect to the nozzle axis. The spray cone angle is approx. 90° to 160°.

Further advantages emerge from the following description of the drawing. Exemplary embodiments of the invention are illustrated in the drawing. The description and the claims contain numerous features in combination. The expert will expediently also consider the features individually and combine them into meaningful further combinations. In the drawing:

DETAILED DESCRIPTION OF THE DRAWINGS

Figure 1:
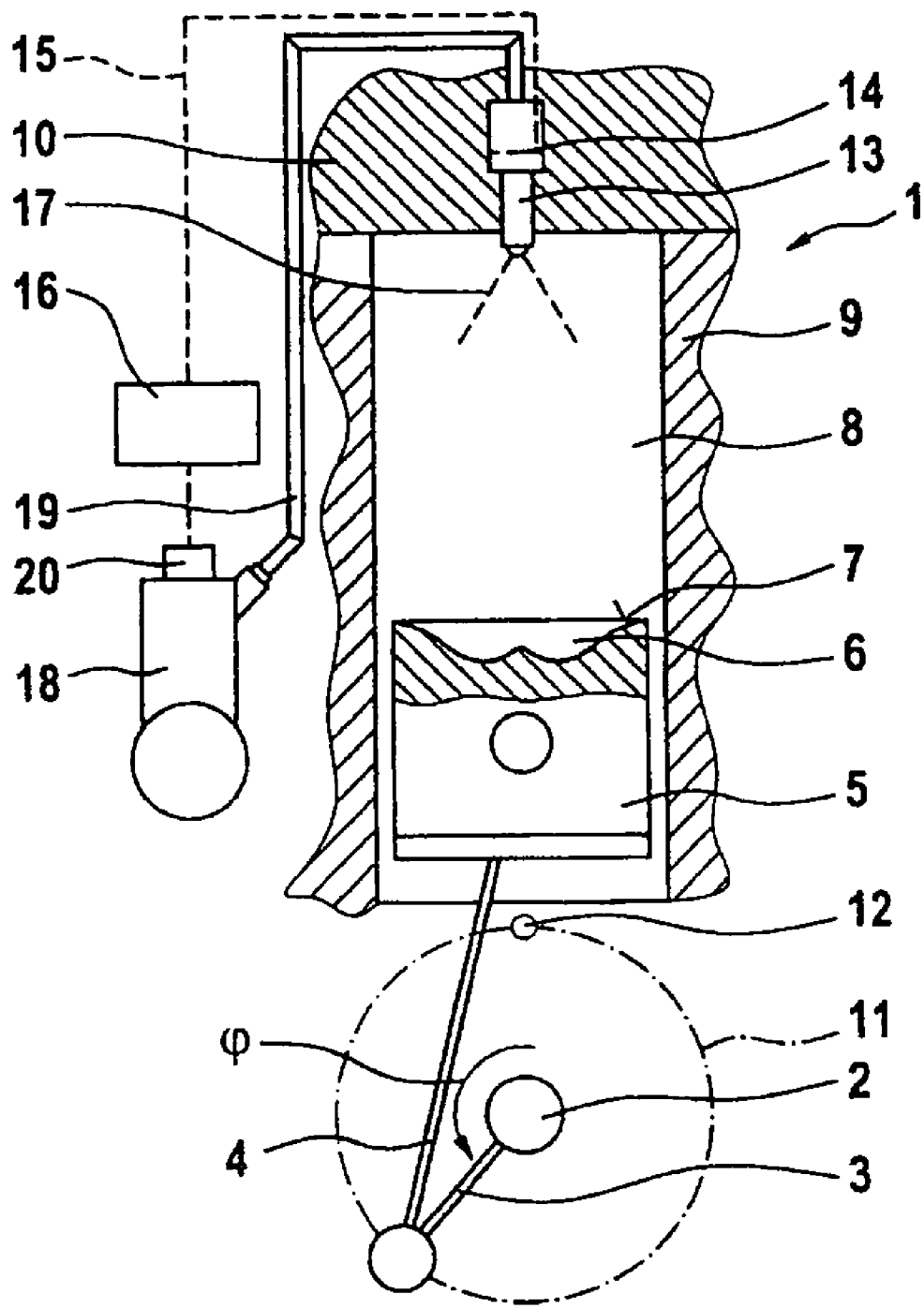
FIG. 1 shows a schematic cross section through an internal combustion piston engine.

FIG. 1 shows an internal combustion piston engine 1, in which a crankshaft 2 is driven via a connecting rod 4 by a piston 5 guided in a cylinder 9. A combustion chamber 8 which comprises a piston recess 6 let into the piston head 7 is formed in the cylinder 9 between the piston 5 and a cylinder head 10.

When a crank 3 of the crankshaft 2 is rotated in a crank circle 11 in the clockwise direction, the combustion chamber 8 is reduced, with the air enclosed in it being compressed. The charge cycle in the combustion chamber 8 takes place via gas exchange valves and gas ducts (neither illustrated) in the cylinder head 10.

With the crank 3 reaching an upper dead-center position 12, referred to as UDC below, the end of the compression is reached, in which the combustion chamber 8 assumes its smallest volume and the maximum compression pressure and the maximum compression temperature are reached. The current position of the piston 5 with respect to the cylinder head 10 is determined by the crank angle $\phi$ in relation to the upper dead-center position 12.

A multi-hole-type injection nozzle 13 is arranged centrally in the cylinder head 10. The injection nozzle 13 is activated by an electronic control unit 16, the engine controller, via a signal line 15 and an actuator 14, for example a piezoactuator. The injection jets emerging from the injection nozzle are denoted by 17.

The fuel is made available by an injection pump 18 in a plurality of pressure stages, a cut-off valve 20, expediently an electronically activatable solenoid valve, restricting the respective maximum pressure in the fuel line 19.

Figure 2:
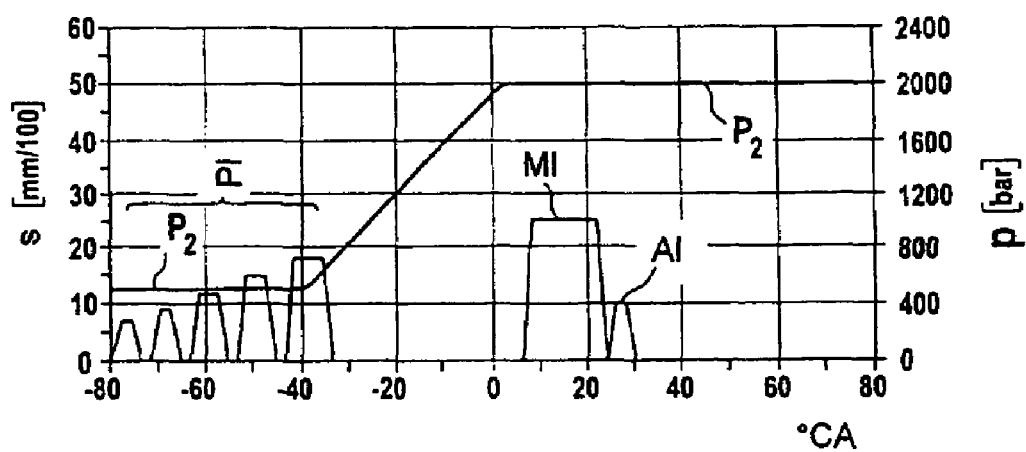
FIG. 2 shows a diagram of a fuel injection profile with pre-injection clocked 5 times and increasing cycle duration and increasing needle stroke at a constant injection pressure, and also a main injection with after-injection at an increased injection pressure.

A first embodiment of a fuel injection strategy for the internal combustion piston engine 1 is illustrated in FIG. 2. The diagram shows a fuel injection profile for a combined homogeneous/heterogeneous operation with pre-injection PI clocked 5 times and increasing cycle duration at a constant injection pressure $P_1$ which is 500 bar, for example. Furthermore, FIG. 2 shows a main injection MI and an after-injection AI at an increased injection pressure $P_2$, with a maximum needle stroke s being set during the main injection MI.

According to the injection strategy illustrated in FIG. 2, first of all at an injection pressure $P_1$ a clocked pre-injection PI takes place in the compression stroke of the internal combustion piston engine 1 in a crank angle range of 80° CA to approximately 35° CA before UDC. The clocked pre-injection PI takes place in such a manner that, during each clocking action, a different needle stroke s is set. The specific clocking of the pre-injection PI results in a homogenization of the injected partial quantities. An increasing setting of the needle stroke is preferred. The main injection and after-injection take place one after the other at a higher injection pressure $P_2$ in a region between UDC and approximately 30° CA after UDC. During the main injection MI, a higher needle stroke s is set than in the pre-injection PI, with the duration of opening of the needle during the after-injection AI being set to be smaller than the duration of opening of the needle in the main injection MI.

Figure 3:
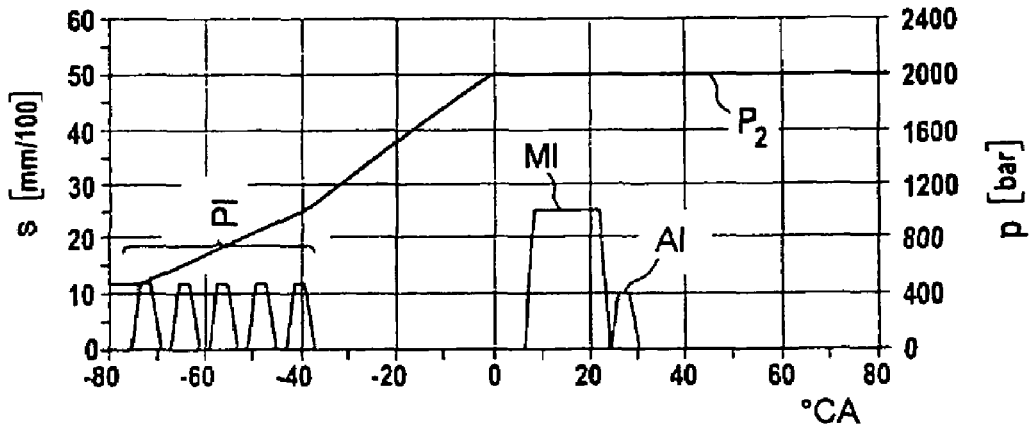
FIG. 3 shows a diagram of a fuel injection profile with pre-injection clocked 5 times and with the cycle duration remaining the same, at a constant needle stroke and increasing injection pressure during the pre-injection, and also a main injection with after-injection at an increased injection pressure.

FIG. 3 is an illustration of a diagram in which an alternative injection strategy for the internal combustion piston engine 1 is shown. It illustrates the fuel injection profile with which a combined homogeneous/heterogeneous operation is obtained with the pre-injection PI clocked 5 times for homogenization with the cycle duration remaining the same and with increasing injection pressure during the pre-injection PI, and with a main injection MI with an increased injection pressure $P_2$ with the needle stroke s set to the maximum and an after-injection AI.

The clocked pre-injection PI according to FIG. 3 takes place in the compression stroke in a crank angle range of approximately 80° CA to approximately 35° CA before UDC. It takes place in such a manner that, during each clocking action, the injection pressure increases, i.e. during the pre-injection PI a lower pressure prevails in a fuel line, for example in a common rail injection system, the line with the early injection, than in the following injection, with the needle stroke s remaining constant during the clocked pre-injection PI. The main injection and after-injection take place successively at a higher injection pressure $P_2$ in a range between the upper dead-center position and approximately 30° CA after UDC. During the main injection MI, a higher needle stroke s is set than during the pre-injection PI, with the duration of opening of the needle during the after-injection AI being set to be smaller than the duration of opening of the needle in the main injection MI.

Figure 4:
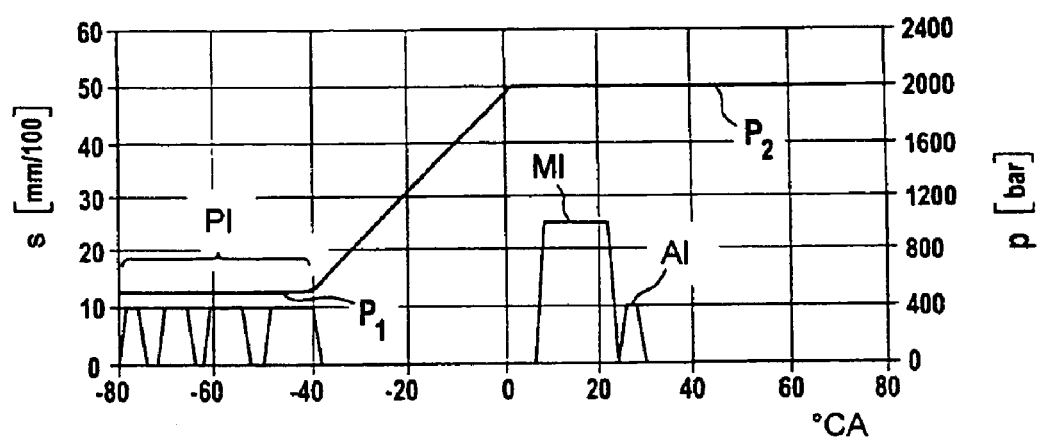
FIG. 4 shows a diagram of a fuel injection profile with pre-injection clocked 4 times and with increasing cycle duration at a constant injection pressure, and also a main injection with after-injection at an increased injection pressure.

One particularly advantageous injection strategy is provided by the injection profile according to FIG. 4. A combined homogeneous/heterogeneous operation with pre-injection clocked 4 times and with increasing cycle duration at a constant injection pressure is proposed therein, in which the nozzle needle 13a remains in a lower stroke position. Furthermore, a main injection MI at an increased injection pressure $P_2$ and a needle stroke s set to the maximum and also an after-injection AI is provided.

The clocked pre-injection PI takes place in the compression stroke in a crank angle range of 80° CA to approximately 35° CA before UDC. It is undertaken in such a manner that, during each clocking action, the injection pressure $P_1$ remains constant. The needle stroke s similarly remains constant during the clocked pre-injection PI. The main injection and after-injection take place successively at a higher injection pressure $P_2$ in a range between the upper dead-center position and approximately 35° CA after UDC. During the main injection MI, a higher needle stroke s is set than during the pre-injection PI, with the duration of opening of the needle during the after-injection AI being set to be smaller than the duration of opening of the needle in the main injection MI.

The low injection pressure $P_1$ in the abovementioned injection strategies according to FIGS. 2, 3 and 4 is selected in such a manner that the clocked pre-injection PI results in a homogeneous mixture formation, in which the injected fuel accumulates to an insignificant extent on the boundary of the combustion chamber 8.

In the above-described injection strategies, the main injection MI of the fuel in the region of the upper dead-center position serves for a heterogeneous mixture formation and permits an increase in the load beyond the load which can be obtained by the homogeneous portion. At the time of the main injection MI, a cool-flame combustion of the homogeneous portion is shut off and a hot-flame combustion takes place. The main injection is designed in such a manner that a temperature level obtained by the main combustion does not lie in the region of increased NOx formation (Zeldovich mechanism). The after-injection serves to reduce the soot particles produced, since a decrease in the main injection quantity by the after-injection quantity makes it possible to prevent the formation of fuel-rich zones.

Figure 5:
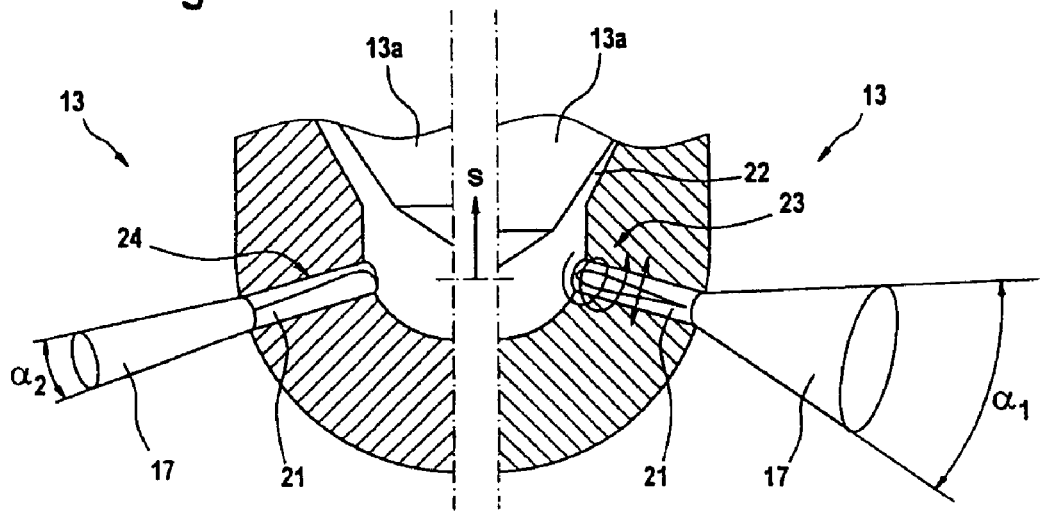
FIG. 5 shows a schematic illustration of the effect of an unstable, cavitating flow in the nozzle hole of a multi-hole-type nozzle.

FIG. 5 is a schematic illustration of the injection nozzle 13 of the blind-hole-type nozzle type, where a nozzle of the seat-hole-type nozzle type would be just as suitable. In the injection nozzle 13 according to FIG. 5, the effect of an unstable, cavitating flow caused in a nozzle hole 21 of the injection nozzle 13 with a small needle stroke s of the nozzle needle 13a, i.e. with the injection nozzle 13 partially open, and the resultant action on the angle of propagation of the injection jet 17 are illustrated.

On the right-hand side in FIG. 5, the injection nozzle 13 is only partially open, as a result of which a throttling in the nozzle needle seat 22 is obtained. This throttling causes an unstable, cavitating flow in the nozzle hole 21 which leads to the angle of propagation $\alpha_1$ of the fuel jet 17. In comparison to an injection nozzle with maximum stroke setting, as is illustrated on the left-hand side of FIG. 5, the angle of propagation $\alpha_1$ due to the unstable, cavitating flow is greater than an angle of propagation $\alpha_2$ which is brought about without such a flow. The unstable, cavitating flow causes sharp fluctuations in the inside flow 23 in the nozzle, these fluctuations leading, when fuel emerges from the nozzle hole 21, to a reinforced disintegration of the fuel jet and therefore to a large angle of propagation $\alpha_1$.

The fuel jet with the angle of propagation $\alpha_1$ propagates in the combustion chamber with intensive atomization, and therefore brings about better homogenization and a rapid evaporation of fuel, with the result that more fuel can be injected in a partial quantity of the pre-injection PI without a significant moistening of the wall of the combustion chamber.

By contrast, in the case of the injection nozzle 13 having the maximum stroke setting according to the left-hand side in FIG. 5, a stable, cavitating flow is formed. In the interior of the nozzle hole 21 on the left-hand side, this flow causes a two-phase flow 24 which leads to a normal disintegration of the fuel. In comparison to a partially open injection nozzle, the angle of propagation $\alpha_2$ caused by the stable, cavitating flow is smaller than the angle of propagation $\alpha_1$.

Figure 6:
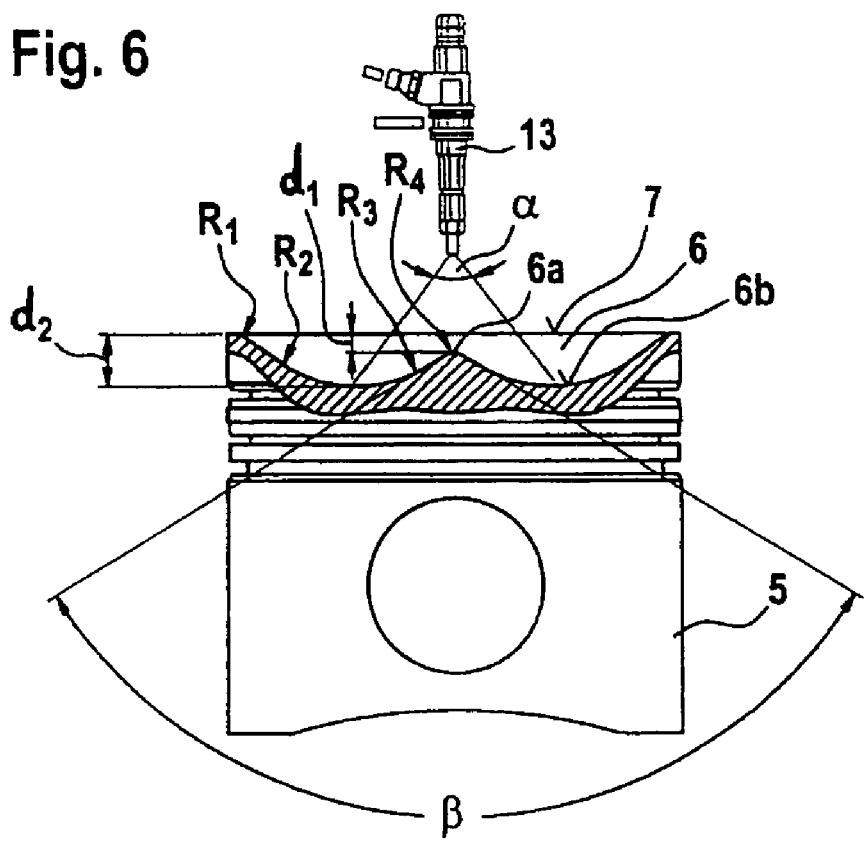
FIG. 6 shows a sectional illustration of the combustion chamber with the arrangement of the injection nozzle and of the piston recess during the pre-injection.

FIG. 6 shows the arrangement of the injection nozzle 13 and of a piston 5 in the combustion chamber 8 during the clocked pre-injection. The piston 5 is situated in the internal combustion piston engine 1 in such a position with respect to the injection nozzle 13 during the pre-injection PI that a fuel cone angle $\alpha$ in a range of 90° to 160° arises.

A piston recess 6 is let into the piston head 7. The piston recess 6 is of plate-like design, with a projection being situated in the center of the piston recess as a piston recess point 6a. The piston recess point 6a is bordered by a recess base 6b. The recess point 6a projects in the direction of the injection nozzle 13.

At the edge, the piston recess 6 has, as transition to the piston head 7, a radius R1 which is preferably between 3 and 7 mm. The outer parts of the recess base 6b are designed with a spherical radius R2 of approximately 45 mm. The transition from the piston recess point 6a to the piston recess base 6b has a curvature with a radius R3 of approximately 20 mm.

The piston recess point 6a is situated approximately opposite the injection nozzle 13. The depth of the piston recess 6 increases from the edge of the piston recess 6 as far as the piston recess base 6b. The piston recess point 6a extends in relation to the injection nozzle 13 in such a manner that it remains approximately below the piston head 7. The distance d1 between the upper point of the piston recess point 6a and the piston head is approximately 6 mm, with it being possible for d1 to preferably be formed between 4 and 8 mm. The recess base depth d2 is approximately 18 mm. In the edge region of the piston recess 6, the plate-like basic shape of the recess has a rounded transition to the piston head in order to avoid accumulations of fuel.

The piston recess point 6a is of conical design with a recess cone angle $\beta$ in the range of 90° to 130° and is designed with a rounded point with a radius R4 of approximately 5 mm. The fuel cone angle $\alpha$ and the position of the piston recess point 6a interact in such a manner that the propagation of the fuel jets is not disturbed by the piston recess point 6a. This ensures that the fuel jets meet in the region of the piston recess 6.

Figure 7:
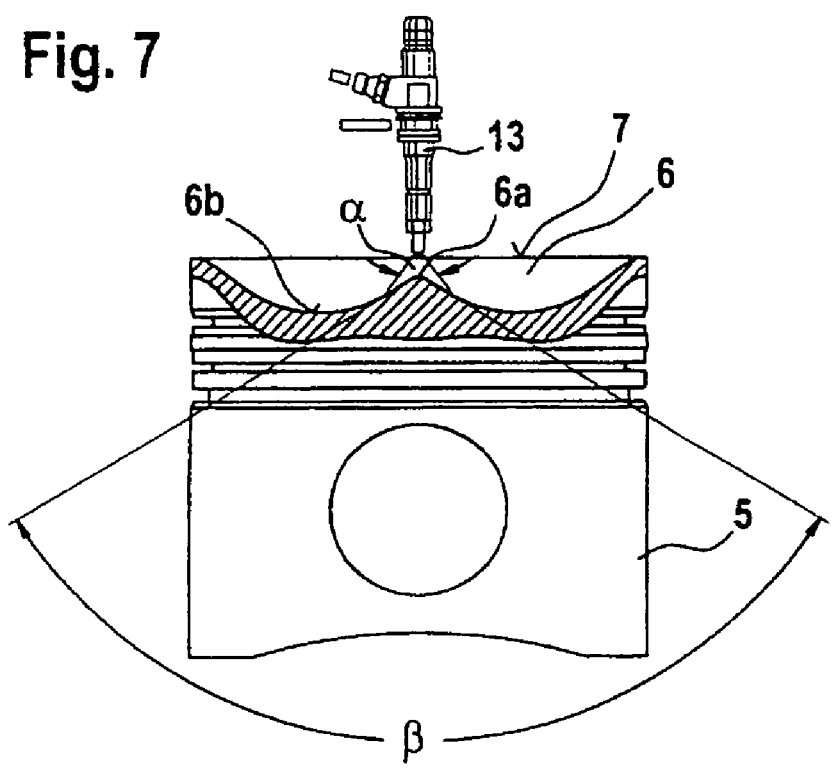
FIG. 7 shows a sectional illustration of the combustion chamber with the arrangement of the injection nozzle and of the piston recess during the main injection.

FIG. 7 illustrates the arrangement of the injection nozzle 13 and of the piston 25 in the combustion chamber 8 during the main injection MI in which the piston recess point 6a shows itself to be very advantageous for the heterogeneous portion of combustion. The piston 5 is situated in a region about UDC in such a position that the injected fuel jets are distributed within the piston recess 6 and are optimally ignited along the recess base 6b.

The main injection MI of the fuel in the region of UDC serves for a heterogeneous mixture formation, a cool-flame combustion of the homogeneous portion being shut off at the time of the main injection MI and a hot-flame combustion being initiated. The mixture formation of the pre-injected quantity of fuel, which formation is obtained in the compression stroke, avoids, during the combustion with a high excess of air, a significant thermal NO formation and the formation of soot, since the fuel is distributed finely and over a large area of the entire combustion chamber. The shape of the piston recess has a very advantageous effect on the main injection MI, with the result that the thermal NO formation for the heterogeneous phase of combustion is significantly reduced, since the concentration of oxygen is already significantly reduced by the preceding, homogeneous portion of combustion and an intensive, turbulent charging movement is further assisted by the piston recess.

The invention is based on an internal combustion engine having compression ignition, in which fuel is injected as a pre-injection and main injection directly into a combustion chamber 8 by means of an injection nozzle 13 having a plurality of injection holes, with the pre-injection PI taking place in a clocked manner. In order to minimize the moistening of the walls of the combustion chamber, a combustion chamber 8 is proposed, in which are arranged an injection nozzle 13 in the region of a cylinder center axis in the cylinder head 10 and a piston recess 6 arranged in the piston head 7, with an approximately centrally situated piston recess projection being arranged in the piston recess 6, and the stroke of a nozzle needle of the injection nozzle 13 being set in such a manner that a restricting of the range of the injected fuel jets is obtained.

The invention claimed is:

1. A method of operating a self igniting internal combustion piston engine, comprising:
    injecting fuel directly into an engine combustion chamber in a plurality of fuel jets of a certain range utilizing an injection nozzle having a nozzle needle and injection holes, said injecting including a plurality of sequential clocked pre-injections at respective pre-injection pressures followed by a main injection at a higher injection pressure than the pre-injection pressures,
    wherein the clocked pre-injections are controlled so that the injected fuel jets have a range smaller than a distance to a boundary of the combustion chamber, and
    wherein the combustion chamber is bounded by a cylinder and a piston, said injection nozzle being disposed in a region of a cylinder central axis and said piston including a piston head which in use faces the injection nozzle and includes a piston recess with an approximately centrally disposed recess projection.

2. A method according to claim 1, comprising:
    further reinforcing of disintegration of the injected fuel jets during said pre-injections.

3. A method according to claim 2, wherein said further reinforcing of disintegration of the injected fuel jets includes varying a stroke of the nozzle needle during the clocked pre-injections.

4. Self-igniting internal combustion piston engine apparatus, comprising:
    fuel injecting means for injecting fuel directly into an engine combustion chamber in a plurality of fuel jets of a certain range utilizing an injection nozzle having a nozzle needle and injection holes, said injecting including a plurality of sequential clocked pre-injections at respective pre-injection pressures followed by a main injection at a higher injection pressure than the pre-injection pressures, and control means for controlling the clocked pre-injection jets to have a range smaller than a distance to a boundary of the combustion chamber, and wherein the combustion chamber is bounded by a cylinder and a piston, said injection nozzle being disposed in a region of a cylinder central axis and said piston including a piston head which in use faces the injection nozzle and includes a piston recess with an approximately centrally disposed recess projection.

5. Apparatus according to claim 4, wherein the projection has a cone angle in a range of 90° to 140°.

6. Apparatus according to claim 4, wherein the piston recess is of a plate like design, with the projection extending from a center of the piston recess in a direction toward the injection nozzle.

7. Apparatus according to claim 6, wherein a piston head surrounds the piston end facing the injection nozzle, and
wherein the piston recess includes:
a flat inlet having a small curvature section starting at the piston head, and
a greater curvature section extending from a maximum recess depth to the projection.

8. Apparatus according to claim 7, wherein a rounded design transition section is formed between the piston head and the piston recess.

9. Apparatus according to claim 8, wherein the projection has a conical shape with a rounded, blunted point.

10. Apparatus according to claim 9, wherein the projection has a cone angle in a range of 90° to 140°.

11. A method for operating a self-igniting internal combustion piston engine, in which fuel is injected directly into a combustion chamber in a plurality of fuel jets of a certain range by means of an injection nozzle comprising a nozzle needle and injection holes, some of the fuel from an injection cycle being injected in partial quantities during a compression cycle as a clocked pre-injection, and remaining fuel being injected at a later time as a main injection into the combustion chamber at a higher injection pressure than during the pre-injection, wherein the pre-injection is clocked in such a manner that, for each partial quantity, a range of the fuel jet in the combustion chamber is restricted to be somewhat smaller than a distance to a boundary of the combustion chamber, whereby a disintegration of the injected fuel jets is reinforced at the same time, and wherein the combustion chamber is bounded by a cylinder and a piston, said injection nozzle being disposed in a region of a cylinder central axis and said piston including a piston head which in use faces the injection nozzle and includes a piston recess with an approximately centrally disposed recess projection.

12. The method as claimed in claim 11, wherein the pressure of the injected fuel is raised during the clocked pre-injection.

13. The method as claimed in claim 11, wherein a fuel cloud of a fuel jet, which cloud is produced during an injection cycle, is offset or displaced laterally during the pre-injection by means of a swirling movement formed in the combustion chamber, so that, during a following injection cycle, the newly injected fuel jets do not penetrate the fuel cloud of the preceding injection cycle.

14. The method according to claim 11, wherein the projection has a cone angle in a range of 90° to 140°.

15. The method as claimed in claim 11, wherein a stroke of the nozzle needle of the injection nozzle is varied in such a manner that an unstable, cavitating flow is produced in the injection holes of the injection nozzle, as a result of which an increased atomization of the fuel in the combustion chamber is obtained.

16. The method as claimed in claim 15, wherein a fuel cloud of a fuel jet, which cloud is produced during an injection cycle, is offset or displaced laterally during the pre-injection by means of a swirling movement formed in the combustion chamber, so that, during a following injection cycle, the newly injected fuel jets do not penetrate the fuel cloud of the preceding injection cycle.

17. The method as claimed in claim 11, wherein a stroke of the nozzle needle of the injection nozzle is varied during the clocked pre-injection.

18. The method as claimed in claim 17, wherein the pressure of the injected fuel is raised during the clocked pre-injection.

19. The method as claimed in claim 11, wherein a cycle duration for the clocked pre-injection is varied for different sequential clocked pre-injections, so that partial quantities of fuel of the pre-injection differ for the respective different clocked pre-injections.

20. The method as claimed in claim 19, wherein the last partial quantity of fuel of the last clocked pre-injection is reduced in relation to the largest partial quantity of fuel that has previously occurred in the pre-injections.

21. The method as claimed in claim 19, wherein a stroke of the nozzle needle of the injection nozzle is varied in such a manner that an unstable, cavitating flow is produced in the injection holes of the injection nozzle, as a result of which an increased atomization of the fuel in the combustion chamber is obtained.

22. The method as claimed in claim 19, wherein the cycle duration of the different clocked pre-injections is varied so that a partial quantity of fuel injected later is larger than a previous partial quantity of fuel.

23. The method as claimed in claim 22, wherein the last partial quantity of fuel of the last clocked pre-injection is reduced in relation to the largest partial quantity of fuel that has previously occurred in the pre-injections.

24. The method according to claim 11, wherein the piston recess is of a plate like design, with the projection extending from a center of the piston recess in a direction toward the injection nozzle.

25. The method according to claim 24, wherein a piston head surrounds the piston end facing the injection nozzle, and
wherein the piston recess includes:
a flat inlet having a small curvature section starting at the piston head, and
a greater curvature section extending from a maximum recess depth to the projection.

26. The method according to claim 25, wherein a rounded design transition section is formed between the piston head and the piston recess.

27. The method according to claim 26, wherein the projection has a conical shape with a rounded, blunted point.

28. The method according to claim 27, wherein the projection has a cone angle in a range of 90° to 140°.

29. A combustion chamber for carrying out the method as claimed in claim 11, wherein the nozzle has an inwardly opening nozzle needle and a plurality of injection holes,
wherein the combustion chamber includes at least one outlet valve, and at least one inlet valve, and
wherein the stroke of the nozzle needle of the injection nozzle is set in such a manner that, within the injection nozzle, an effective flow cross section between the nozzle needle and the needle seat is approximately 0.4 to 1.5 times an effective flow cross section of the sum of all of the injection holes.

30. The combustion chamber as claimed in claim 29, wherein the piston recess is of plate-like design, with the projection extending from the center of the piston recess in a direction of the opposite injection nozzle.

31. The combustion chamber as claimed in claim 30, wherein the piston recess has, from the piston head, first of all a flat inlet having a small curvature and, from the region of the maximum recess depth, a greater curvature reaching into the piston recess projection.

32. The combustion chamber as claimed in claim 31, wherein a transition formed between the piston head and the piston recess is of rounded design.

33. The combustion chamber as claimed in claim 32, wherein the piston recess projection has a conical shape with a rounded, blunted point.

34. The combustion chamber as claimed in claim 33, wherein the piston recess projection has a cone angle in a range of 90° to 140°.

* * * * *